United States Patent
Li et al.

(10) Patent No.: US 11,663,191 B2
(45) Date of Patent: May 30, 2023

(54) METHOD, DEVICE AND COMPUTER PROGRAM PRODUCT FOR MANAGING LOG

(71) Applicant: EMC IP Holding Company LLC, Hopkinton, MA (US)

(72) Inventors: Naifeng Li, Shanghai (CN); Jiajie Sun, Shanghai (CN); Jun Wu, Shanghai (CN); Zihao Jiang, Shanghai (CN); Minggang Lu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 248 days.

(21) Appl. No.: 16/362,914

(22) Filed: Mar. 25, 2019

(65) Prior Publication Data
US 2019/0384756 A1    Dec. 19, 2019

(30) Foreign Application Priority Data
Jun. 15, 2018   (CN) .......................... 201810623462.7

(51) Int. Cl.
   *G06F 16/23*   (2019.01)

(52) U.S. Cl.
   CPC .............................. *G06F 16/2365* (2019.01)

(58) Field of Classification Search
   CPC combination set(s) only.
   See application file for complete search history.

(56) References Cited

U.S. PATENT DOCUMENTS

| | | | |
|---|---|---|---|
| 5,615,335 A | 3/1997 | Onffroy et al. | |
| 7,103,797 B1 | 9/2006 | Wahl et al. | |
| 7,475,207 B2 | 1/2009 | Bromling et al. | |
| 7,562,250 B2 | 7/2009 | Wahl et al. | |
| 7,885,296 B2 * | 2/2011 | Biederman | H04J 3/0697 370/503 |
| 8,181,057 B2 * | 5/2012 | Nichols | G01V 1/40 713/401 |
| 10,037,251 B1 | 7/2018 | Bono et al. | |
| 2008/0025344 A1 * | 1/2008 | Biederman | H04J 3/0697 370/498 |

(Continued)

FOREIGN PATENT DOCUMENTS

| | | |
|---|---|---|
| CN | 1536788 | 10/2004 |
| CN | 103617287 | 3/2014 |

(Continued)

*Primary Examiner* — Hosain T Alam
*Assistant Examiner* — Anthony G Gemignani
(74) *Attorney, Agent, or Firm* — BainwoodHuang (57) ABSTRACT

Techniques perform log management. Such techniques involve obtaining a count value of a counter associated with a log entry in the log, the count value of the counter incrementing at a predetermined frequency. Such techniques further involve determining a rough time instant when the log entry is created based on the count value, a reference count value of the counter associated with the log entry, a reference time corresponding to the reference count value and the frequency. Such techniques further involve correcting the rough time instant based at least in part on the frequency and a set of count values of the counter corresponding to a set of time instants, to determine a corrected time when the log entry is created. Accordingly, the log backed up to the external storage device has accurate time information.

19 Claims, 7 Drawing Sheets

(56) References Cited

U.S. PATENT DOCUMENTS

| | | | | |
|---|---|---|---|---|
| 2012/0019413 A1* | 1/2012 | Fretenburg | ................ | G01S 5/14 |
| | | | | 342/387 |
| 2013/0013911 A1* | 1/2013 | Gustafsson | ........... | G06F 1/3203 |
| | | | | 713/100 |
| 2014/0317633 A1* | 10/2014 | Zhai | ..................... | G06F 9/4825 |
| | | | | 718/103 |

FOREIGN PATENT DOCUMENTS

| | | |
|---|---|---|
| CN | 104346253 | 2/2015 |
| CN | 104391903 | 3/2015 |
| CN | 104598356 | 5/2015 |
| CN | 105446289 | 3/2016 |
| CN | 106663048 | 5/2017 |

* cited by examiner

METHOD, DEVICE AND COMPUTER PROGRAM PRODUCT FOR MANAGING LOG

CROSS-REFERENCE TO RELATED APPLICATION(S)

This application claims priority to Chinese Patent Application No. CN201810623462.7, on file at the China National Intellectual Property Administration (CNIPA), having a filing date of Jun. 15, 2018, and having "METHOD, DEVICE AND COMPUTER PROGRAM PRODUCT FOR MANAGING LOG" as a title, the contents and teachings of which are herein incorporated by reference in their entirety.

FIELD

Embodiments of the present disclosure generally relate to the field of log management, and more specifically, to a method, device and computer program product for managing a log.

BACKGROUND

In the field of software engineering, some log information is recorded during the running of a program or process. When the program or the process fails, the recorded log information will assist the technicians to know some key information in the program or the process, so as to facilitate the technicians to rapidly solve the failure. However, in a storage system, as the storage system becomes more and more complex, recording log information becomes more and more important, especially for addressing the issues about customers' data unavailability and data loss. The recorded log information can help the users recover their data in a short time.

Along with the running of the program, the amount of data in the log is getting larger and larger. Therefore, the log data is usually stored in an external storage device. The log information stored in the external device contains time information associated with the log entry. However, the time information is obtained from calculation and might be inaccurate sometimes. Thus, the inaccurate time may cause that the log cannot be accurately applied to recover data or perform various processing.

SUMMARY

Embodiments of the present disclosure provide a method, device and computer program product for managing a log.

According to a first aspect of the present disclosure, there is provided a method of managing a log. The method includes obtaining a count value of a counter associated with a log entry in the log, the count value of the counter incrementing at a predetermined frequency. The method also includes determining a rough time instant when the log entry is created based on the count value, a reference count value of the counter associated with the log entry, a reference time corresponding to the reference count value and the frequency. The method further includes correcting the rough time instant based at least in part on the frequency and a set of count values of the counter corresponding to a set of time instants, to determine a corrected time when the log entry is created.

According to a second aspect of the present disclosure, there is provided an electronic device for managing a log. The electronic device includes: a processor; and a memory having computer program instructions stored thereon, the processor executing the compute program instructions in the memory to control the electronic device to perform acts including: obtaining a count value of a counter associated with a log entry in the log, the count value of the counter incrementing at a predetermined frequency. The actions also include determining a rough time instant when the log entry is created based on the count value, a reference count value of the counter associated with the log entry, a reference time corresponding to the reference count value and the frequency. The actions further include correcting the rough time instant based at least in part on the frequency and a set of count values of the counter corresponding to a set of time instants, to determine a corrected time when the log entry is created.

According to a third aspect of the present disclosure, there is provided a computer program product being tangibly stored on a non-volatile computer-readable medium and including machine-executable instructions which, when executed, cause a machine to perform steps of the method according to the first aspect of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

In each drawing, same or corresponding signs indicate the same or corresponding components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more details with reference to the drawings. Although the drawings illustrate some embodiments of the present disclosure, it should be appreciated that the present disclosure can be implemented in various manners and should not be limited to the embodiments described herein. On the contrary, the embodiments are provided to understand the present disclosure in a more thorough and complete way. It should be appreciated that drawings and embodiments of the present disclosure are only by way of example rather than restricting the protection scope of the present disclosure.

In the descriptions of the embodiments of the present disclosure, the term "includes" and its variants are to be considered as open-ended terms that mean "includes, but is not limited to." The term "based on" is to be understood as "based at least in part on." The terms "one embodiment" and "this embodiment" are to be read as "at least one embodiment." The terms "first", "second" and so on can refer to same or different objects. The following text also can include other explicit and implicit definitions.

The principle of the present disclosure will be described with reference to the several example embodiments shown in the drawings. Although the drawings illustrate preferred embodiments of the present disclosure, it should be understood that the embodiments are described herein merely enable those skilled in the art to better understand and further implement the present disclosure and is not intended for limiting the scope of the present disclosure in any manner.

During logging, a log-producing process, while storing the log, only writes a count value determined by a 64-bit timestamp counter, rather than the time information, in order to avoid consuming too many resources. When storing the log information into an external storage device by a recording process, the recording process determines logging time of the log based on the count value. Afterwards, the recording process stores the determined logging time together with the log information in the external device for future use.

However, when the recording process determines the logging time of the log, the time determined by the count value and the CPU frequency is not accurate because the CPU frequency acquired from a kernel of an operating system is not precise enough. Besides, a difference value between the calculated time and an actual logging time will increase as the time increases. Therefore, a large time difference will be generated, which causes that the logging time of the log cannot be accurately determined, such that the recovered data are incorrect during log recovery.

Thus, in order to solve the above problem, the present disclosure proposes a technical solution of correcting the calculated time. In this technical solution, the logging process records a plurality of time instant and count values corresponding to the plurality of the time instant (such as count value of the 64-bit timestamp counter) within a predetermined time period to determine an adjustment factor between the calculated logging time and the actual logging time. Then, the adjustment factor is applied into the logging time of the log information to obtain the adjusted logging time. By applying the adjustment factor, the logging time of the log can be more accurately adjusted, such that the calculated logging time can correspond to the actual logging time in a more accurate manner.

Figure 1:
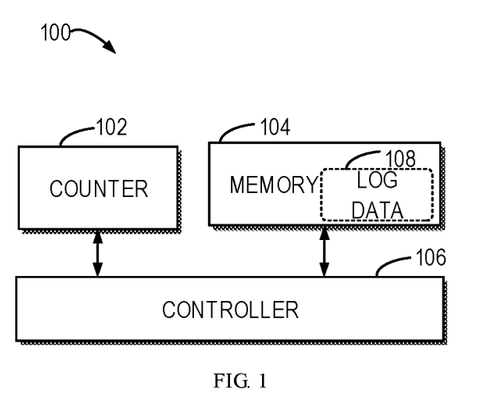
FIG. 1 illustrates a schematic diagram of an example environment 100 where a device and/or method can be implemented according to embodiments of the present disclosure.

FIG. 1 below illustrates a schematic diagram of an example environment 100 where a device and/or method can be implemented according to embodiments of the present disclosure. In the environment, there are counter 102, a memory 104 and a controller 106.

The counter 102 can output a count value for use by a producing process that produces log information. Therefore, the log information includes a count value outputted by the counter. The count value of the counter 102 also can be used by a recording process, which records the log information to an external storage apparatus. The counter 102 can be a timestamp counter, such as a 64-bit timestamp counter.

The memory 104 is used for storing the data information. In the memory 104, is the log data 108 are stored therein. The log data includes a count value (such as count value of the timestamp counter). In an example, the storage area which stores the log information can be shared by the producing process that produces log data and the recording process that stores the log data to the external storage apparatus. In an alternative embodiment, a dedicated memory, which is shared by the producing process and the recording process, can be configured. Alternatively, or additionally, the dedicated memory can be a memory different from the memory 104.

The controller 106 is used for managing recording and storage of the log information. The controller can read the log information from the memory 104. Alternatively, or additionally, the controller 106 also can read the log information from other storage apparatuses which store the log information. The controller 106 also can obtain a count value from the counter 102. The counter 102 obtains a correction factor for correcting the time based on a set of the logging time instants and a plurality of count values corresponding to the set of logging time instants within a predetermined time period.

The above FIG. 1 describes an example environment 100 for managing the log. A method for managing the log will be described in details below with reference to a flowchart 200 of FIG. 2.

Figure 2:
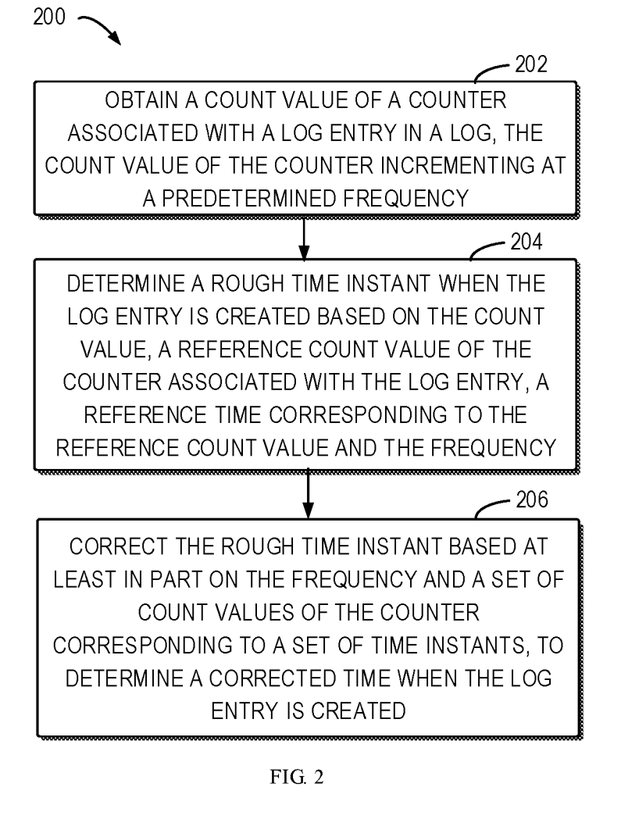
FIG. 2 illustrates a flowchart of a method 200 for managing the record of the log according to embodiments of the present disclosure.

In the present disclosure, the log is generated by a producing process, and the generated log data includes a count value of the counter 104, e.g., a count value of the 64-bit timestamp counter. The recording process of the log can obtain the log data produced by the producing process, and the logging time of the log is determined based on the count value in the log data. Then, the determined logging time and the log data are together stored in the external storage device.

The recording process of the log can obtain the log data generated by the producing process through various manners. In one example, the producing process can store the log data in the shared storage area, which also can be accessed by the recording process. The shared storage area can be a ring-shaped buffer area. Then, the recording process of the log obtains the log data from the shared storage area. In a further example, the logging process can obtain the log data in various suitable ways based on the requirements.

After the recording process of the log obtains the log data, it is required that a count value of the counter is obtained from the log data. At block 202, a count value of the counter associated with a log entry in the log is obtained and the count value of the counter incrementing at a predetermined frequency. In one example, the counter is a timestamp counter, such as 64-bit timestamp counter.

In one example, the predetermined frequency can be determined by a set of count values of the counter corresponding to a set of time instants recorded within the predetermined time period. The procedure of determining the frequency will be described in details below with reference to FIGS. 3 and 4. Alternatively or additionally, the count value of the counter is related to the local dynamic CPU frequency. In another example, the predetermined frequency can be the CPU frequency obtained from a kernel of an operating system.

After acquiring the count value of the log entry, at block 204, the recording process will determine a rough time instant when the log entry is created based on the count value, a reference count value of the counter associated with the log entry, a reference time corresponding to the reference count value and the frequency.

In the embodiments of the present disclosure, because the log only records the count value, it is required that the reference count value and the reference time should be obtained to determine the logging time instant of the log. In one example, the reference count value and the reference time are written into the shared storage area by the producing process of the log at the beginning of the operation. Then, the recording process obtains the reference count value and the reference time from the shared storage area. In another example, the logging process also can obtain the reference count value and the reference time directly from the producing process.

In one example, the reference time is a time when the producing process for producing logs starts and the reference count value is a count value corresponding to the start time of the producing process. In a further example, the reference time and the count value corresponding to the reference time can be configured as any suitable time points and a count value corresponding to the time point by a user based on the requirements.

After the recording process obtains a count value of the log entry, a reference count value, a reference time corresponding to the reference count value and the frequency, a rough logging time instant can be calculated by the following formula:

$$\text{calculated\_logging\_time} = \text{start\_time} + \frac{(\text{logging\_TSC-start\_TSC})}{\text{frequency}} \quad (1)$$

Where calculated logging time represents a calculated rough logging time instant of the log entry; start time is the reference time instant; and start TSC is a reference count value corresponding to the reference time instant. Frequency is an incremental frequency of the counter and logging TSC is a count value in the log entry.

In one example, the frequency can be determined by a set of count values corresponding to a set of time instant recorded within the predetermined time period. In a further example, the frequency can be obtained from a kernel of an operating system.

After the rough time instant of the log entry is determined, the rough time instant is corrected based at least in part on the frequency and a set of count values of the counter corresponding to a set of time instants at block 206, to determine the corrected time when the log entry is created.

Because the rough time instant of the log entry is known, embodiments of the present disclosure determine the corrected time instant of the entry by adding a correction factor to the rough time of the log entry, to more accurately determine the logging time of the log entry. Then, the corrected time instant used as the logging time of the log entry together with the log data is stored in the external storage device.

Figure 6:
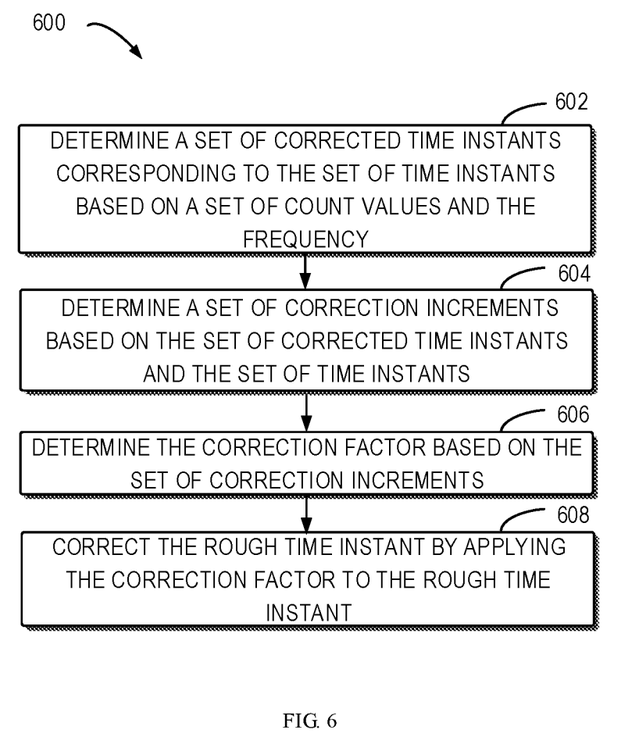
FIG. 6 illustrates a flowchart of a method 600 for correcting the rough time instant according to embodiments of the present disclosure.

Correction of the rough time instant based on the frequency and a set of count values of the counter corresponding to a set of time instant will be further described in details below with reference to FIGS. 4 and 6.

The above FIG. 2 describes a procedure of managing the log. A procedure of determining the incremental frequency of the counter will be described in details below with reference to FIGS. 3 and 4.

Figure 3:
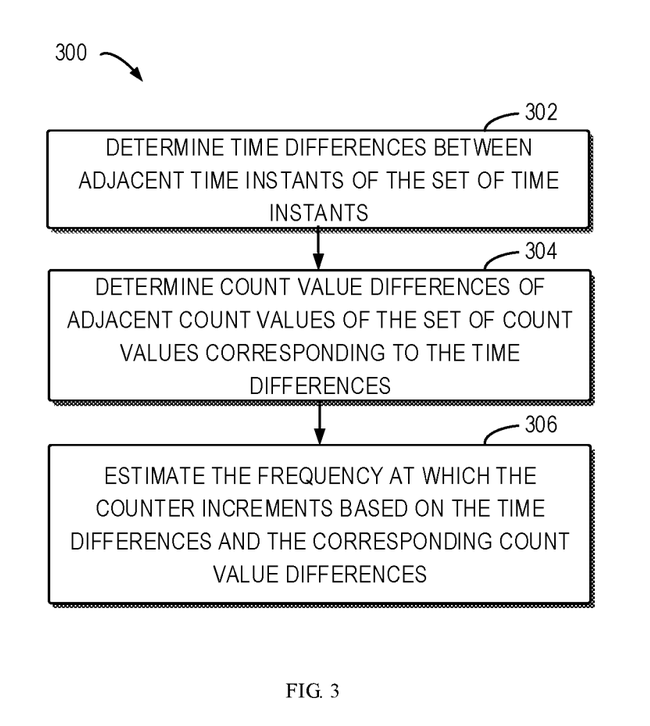
FIG. 3 illustrates a flowchart of a method 300 for determining the frequency according to embodiments of the present disclosure.

In the embodiments of the present disclosure, the incremental frequency of the counter is determined by a set of count values corresponding to a set of time instants. When the frequency is being determined, it is required that time differences between adjacent time instants of the set of time instants are firstly determined at block 302.

When the frequency is being determined, the recording process of the log needs to record a set of time instants and count values corresponding to the set of time instants within a predetermined time period. As shown in FIG. 4, a set of time instants $T_1$, $T_2$, $T_3$, $T_4$, $T_5$ and $T_6$ are recorded, i.e., 6 time instants are recorded. Besides, count values $TSC_1$, $TSC_2$, $TSC_3$, $TSC_4$, $TSC_5$ and $TSC_6$ of the counter corresponding to the set of time instants are also recorded.

In one example, 6 time instants and count values corresponding to the 6 time instants are recoded within every 100 ms. In a further example, 6 time instants and count values corresponding to the 6 time instants are recorded within 2 minutes. In other examples, those skilled in the art can set any number of time instants and count values corresponding to the time instants within a random time period based on the requirements. Alternatively or additionally, a time length of 100 ms is employed when the frequency is determined for the first time, and a time length of 2 minutes is used when the frequency is determined again. The above time length and the number of recording time instants are only examples, and those skilled in the art can set any number of time instants and corresponding count values within a random time length based on the requirements.

After a set of time instants are determined, the time difference $\Delta T$ of the adjacent time is calculated by the formula below:

$$\Delta T_{(x)}(x=1,2,3,4,\ldots,n-1)=T_{(x+1)}-T_{(x)} \quad (2)$$

Where n is a positive integer, which indicates the number of recorded time instants, and $T_x$ represents an x-th time instant recorded by the recording process.

The procedure of determining the frequency is now described with reference to FIG. 4.

Figure 4:
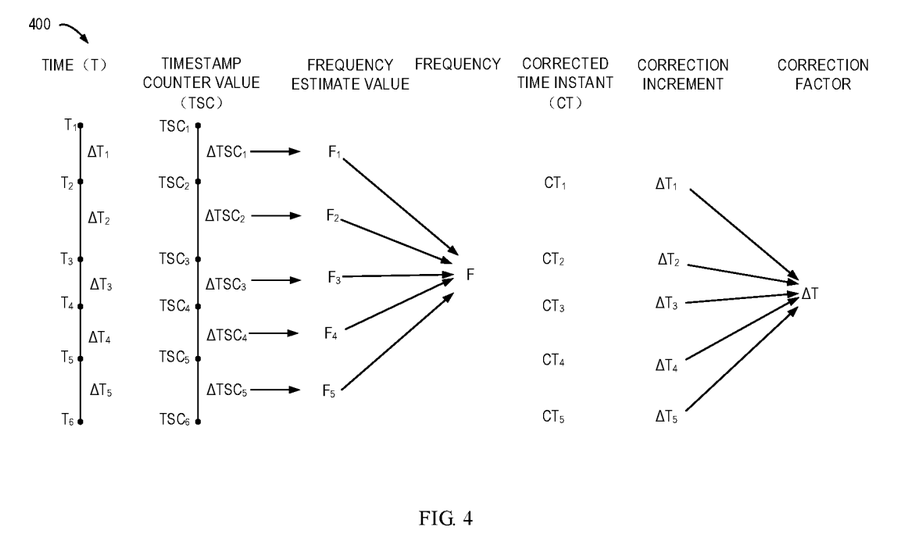
FIG. 4 is a schematic diagram 400 for determining the frequency and the correction factor according to embodiments of the present disclosure.

A set of time instants illustrated in FIG. 4 includes 6 time instants $T_1$, $T_2$, $T_3$, $T_4$, $T_5$ and $T_6$, so there are five time differences $\Delta T_1$, $\Delta T_2$, $\Delta T_3$, $\Delta T_4$, and $\Delta T_5$. FIG. 4 is only used as an example to explain the present disclosure and should not be interpreted as restrictions over the present disclosure. Those skilled in the art can set any number of time instants and count values corresponding to any number of time instants based on the requirements.

The count value differences, which correspond to the time differences, of adjacent count values of the set of count values is determined at block 304. The count value differences ΔTSC of a set of count values corresponding to the time differences can be obtained via the following manners:

$$\Delta TSC_{(x)}(x=1,2,3,4,\ldots,n-1)=TSC_{(x+1)}TSC_{(x)} \quad (3)$$

Where n is a positive integer and $TSC_x$ represents the counter value of the x-th time instant.

As shown in FIG. 4, there are five count value differences $\Delta TSC_1$, $\Delta TSC_2$, $\Delta TSC_3$, $\Delta TSC_4$ and $\Delta TSC_5$ corresponding to the five time differences.

At block 306, the frequency at which the counter increments are estimated based on the time differences and the corresponding count value differences. In one example, after determining the time differences and the count value differences, the time differences and the count value differences can be applied into a mathematical formula to calculate the frequency of the counter. When the time differences $\Delta T_1$, $\Delta T_2$, $\Delta T_3$, $\Delta T_4$, and $\Delta T_5$ and the count value differences $\Delta TSC_1$, $\Delta TSC_2$, $\Delta TSC_3$, $\Delta TSC_4$ and $\Delta TSC_5$ are determined in FIG. 4, the frequency f is determined using the above values. The procedure of obtaining the frequency via the time differences and the corresponding count values will be further described in details with reference to FIGS. 4 and 5.

The above method determines the frequency based on the time differences of adjacent time instants in the set of time instants and the differences of adjacent count values in the set of count values. Therefore, the frequency is obtained from a plurality of count value differences and time differences, rather than using a one-time obtained frequency only, which improves the frequency accuracy, so as to more accurately determine the recording time of the log.

As described above, FIG. 5 describes a procedure of determining the frequency by the time differences and the corresponding count value differences. The procedure will be described in details below with reference to FIG. 4.

Figure 5:
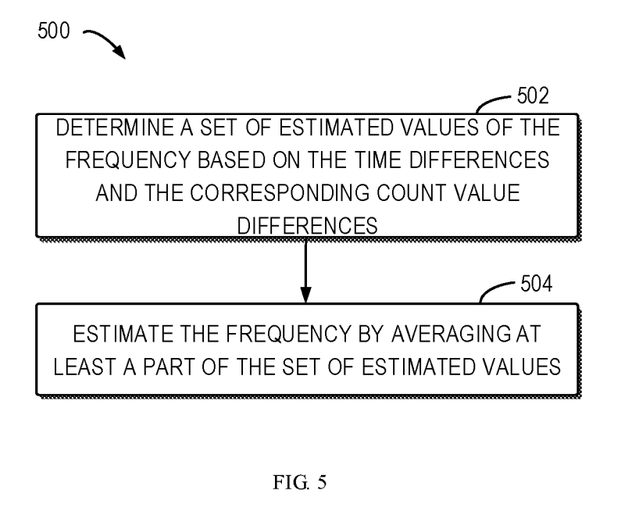
FIG. 5 illustrates a flowchart of a method 500 for determining an estimated frequency according to embodiments of the present disclosure.

At block 502, a set of estimate values of the frequency are firstly determined based on the time differences and the corresponding count value differences.

When the time differences and the count value differences are determined, the incremental frequency of the counter can be determined based on the count value difference sand the time differences via the following formula, i.e., determining a set of estimate values $f_{(x)}$ of the frequency.

$$f_{(x)}(x=1,2,3,4,\ldots,n-1)=\Delta TSC_{(x)}/\Delta T_{(x)} \quad (4)$$

Where n is a positive integer, indicating the number of logging time instants.

According to FIG. 4, estimate values $f_1$, $f_2$, $f_3$, $f_4$ and $f_5$ of the frequency corresponding to the 5 count value differences $\Delta TSC_1$, $\Delta TSC_2$, $\Delta TSC_3$, $\Delta TSC_4$ and $\Delta TSC_5$ can be obtained.

When a set of estimate values of the frequency are determined, the frequency f is estimated by averaging at least a part of the set of estimate values at block 504.

After a set of estimate values of the frequency are obtained, it is required that the frequency is determined via the set of estimate values. In one example, the estimated values of the set of estimated values within a predetermined range are averaged to estimate the frequency. Alternatively or additionally, the maximum estimated value and the minimum estimated value in the set of estimated values are removed and then the remaining estimated values are averaged. In a further example, those skilled in the art can set an appropriate method in accordance with the requirements to obtain the frequency from the set of estimated values.

In one example, in the above procedure of determining a set of estimated values of the frequency via the time differences and the count value differences, it also can be determined whether the estimated value determined from each time difference and count value difference is within the predetermined range; when the frequency value determined by the time difference and the corresponding count value difference is greater than a first predetermined threshold, the first predetermined threshold is used as the estimate value; when the frequency value determined by the time difference and the corresponding count value difference is smaller than a second predetermined threshold, the second predetermined threshold is used as the estimate value and the second predetermined threshold is smaller than the first predetermined threshold. Alternatively, or additionally, the first predetermined threshold is set to 1.25f and the second predetermined threshold is set to 0.75f. Alternatively, or additionally, the above procedure of determining whether each estimate value is within the predetermined range is utilized in the procedure of determining the frequency after the first time. Alternatively, or additionally, the first predetermined threshold and the second predetermined threshold are determined based on the historical data or the experience of those skilled in the art.

The above method of averaging a part of estimate values of a set of frequencies ensures that the obtained frequency is more accurate, thereby avoiding the inaccuracy issue caused by using a single frequency alone. Besides, the maximum estimate value and the minimum estimate value are also removed during the calculation procedure, which avoids the issue of lack of accuracy in the frequency resulted from oversized or undersized frequency values produced due to special circumstances, thereby further guaranteeing the accuracy of the calculated frequency.

The procedure of determining the frequency is described above with reference to FIGS. 3, 4 and 5. The procedure of correcting the rough time instant will be described below with reference to FIGS. 4 and 6.

When the rough time instant is being corrected, a set of corrected time instants corresponding to the set of time instants are firstly determined based on a set of count values and the frequency at block 602.

In one example, the frequency has been determined via the count values corresponding to the set of time instants as described above. Therefore, a set of corrected time $CT_{(x)}$ can be determined based on the frequency, the set of time instant and the set of count values via the following formula.

$$CT_{(x)}(x=1,2,3,4,\ldots,n)=T_{(x)}+\frac{TSC_{(x+1)}-TSC_{(x)}}{f} \quad (5)$$

Where n is a positive integer, $CT_{(x)}$ represents a corrected time instant corresponding to the x-th time instant and f indicates the frequency determined by method 300 or a processor frequency obtained from a kernel of the operating system.

As shown in FIG. 4, six time instants are configured. Therefore, five corrected time instants $CT_1$, $CT_2$, $CT_3$, $CT_4$ and $CT_5$ are generated.

When a set of corrected time instants is determined, a set of corrected increments are determined based on the set of corrected time instants and the set of time instants at block 604.

Thus, a set of corrected increments $\Delta t_{(x)}$ is calculated based on the set of corrected time instants and the set of time instant via the formula below.

$$\Delta t_{(x)}(x=1,2,3,4,\ldots,n)=T_{(x+1)}CT_{(x)} \quad (6)$$

Where n is a positive integer.

As shown in FIG. 4, there are five increments $\Delta t_1$, $\Delta t_2$, $\Delta t_3$, $\Delta t_4$ and $\Delta t_5$.

In one example, the corrected increment should be judged during the procedure of determining the corrected increment, for example, if $T_{(x+1)}$ is greater than $CT_{(x)}$, the corrected increment is a difference therebetween; if $T_{(x+1)}$ is smaller than $CT_{(x)}$, the corrected increment is set to 0.

After a set of correction increments are determined, a correction factor $\Delta t$ is determined based on the set of correction increments at block 606.

When the corrected factor is determined after obtaining a set of correction increments, the correction factor can be determined by averaging at least a part of the set of correction increments. In one example, the correction increments of the set of correction increments within the predetermined range are averaged to determine the correction factor. Alternatively or additionally, the maximum value and the minimum value in the set of correction increments are removed and the remaining correction increments are averaged to acquire the correction factor.

At block 608, the rough time instant is corrected by applying the correction factor to the rough time instant. By combining the calculated correction factor with the rough time instant, the accurate logging time logging_time of the log can be determined by the following formula.

$$\text{logging\_time}=\text{calculated\_logging\_time}+\Delta t \quad (7)$$

The accuracy of the calculated logging time instant can be improved by the above method of correcting the rough time instant with the calculated correction factor, so as to ensure that the log time stored to the external storage device is accurate. Moreover, the accuracy of the acquired correction factor can be increased by averaging the correction factor, which avoids the possible inaccuracy issue caused by using a single correction factor alone.

Figure 7:
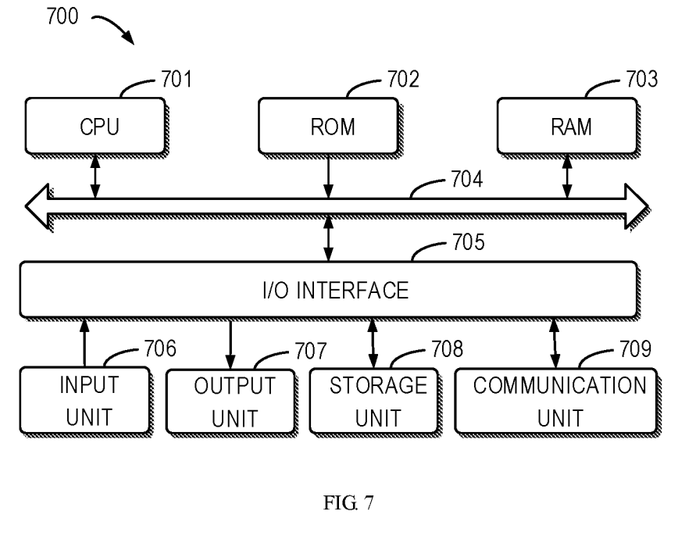
FIG. 7 illustrates a schematic block diagram of an example device 700 suitable for implementing embodiments of the present disclosure.

FIG. 7 illustrates a schematic block diagram of an example device 700 for implementing embodiments of the present disclosure. For example, any one of 102, 104 and 106 shown in FIG. 1 can be performed by the device 700. As shown, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as disk, optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described various procedures and processing, such as methods 200, 300, 500 and 600, can be executed by the processing unit 701. For example, in some embodiments, 200, 300, 500 or 600 can be implemented as computer software programs tangibly included in the machine-readable medium, such as storage unit 708. In some embodiments, the computer program can be partially or fully loaded and/or mounted to the device 700 via ROM 702 and/or communication unit 709. When the computer program is loaded to RAM 703 and executed by the CPU 701, one or more actions of the above described method 200, 300, 500 or 600 can be performed.

The present disclosure can be method, apparatus, system and/or computer program product. The computer program product can include a computer-readable storage medium having computer-readable program instructions stored thereon for executing various aspects of the present disclosure.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via network, such as Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storing into the computer-readable storage medium of each computing/processing device.

The computer program instructions for executing operations of the present disclosure can be assembly instructions, instructions of instruction set architecture (ISA), machine instructions, machine-related instructions, microcode, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only by way of example rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure

We claim:

1. A method of correcting rough logging times of log entries in a log of a storage system, comprising:
    recording respective log entries in the log, the log entries including associated rough logging times and log information obtained during the running of a program or process of the storage system;
    obtaining, from a timestamp counter, a plurality of count values associated with the respective log entries, the count values representing respective timestamps;
    determining, using a kernel of an operating system running on the storage system, a plurality of time instants representing the rough logging times of the respective log entries, the plurality of time instants including a target rough time instant to be corrected;
    generating respective estimates of a previously existing processor frequency of a processor in the storage system from count values and time instants of each of multiple pairs of log entries;
    generating a corrected processor frequency of the processor based on the estimates, the corrected processor frequency being more accurate than a frequency of the processor obtained from the kernel; and
    correcting the target rough time instant based at least in part on the corrected processor frequency, to determine a corrected time when a corresponding log entry in the log was created.

2. The method of claim 1, wherein generating the respective estimates includes:
    determining, for each pair in the multiple pairs of log entries, a time difference between the time instants of the respective pair; and
    determining, for each pair in the multiple pairs of log entries, a count value difference between the count values of the respective pair,
    wherein generating the estimates is based on the time difference and count value difference of each pair in the multiple pairs of log entries.

3. The method of claim 2, wherein generating the corrected processor frequency includes:
    averaging the estimates.

4. The method of claim 3, wherein averaging the estimates includes:
    averaging estimates with values within a predetermined range.

5. The method of claim 3, wherein generating the respective estimates includes:
    in response to an estimate being greater than a first predetermined threshold, using the first predetermined threshold as the estimate;
    in response to an estimate being smaller than a second predetermined threshold, using the second predetermined threshold as the estimate, the second predetermined threshold being smaller than the first predetermined threshold.

6. The method of claim 1, wherein correcting the target rough time instant includes
determining, based on the plurality of count values and the corrected processor frequency, a set of corrected time instants;
determining, based on the set of corrected time instants, a set of correction increments;
determining a correction factor based on the set of correction increments; and
correcting the target rough time instant by applying the correction factor to the target rough time instant.

7. The method of claim 6, wherein determining a correction factor comprises:
determining the correction factor by averaging at least a part of the set of correction increments.

8. The method of claim 7, wherein determining the correction factor by averaging at least a part of the set of correction increments comprises:
determining the correction factor by averaging correction increments of the set of correction increments within a predetermined range.

9. The method of claim 1, wherein the timestamp counter is a timestamp circuit;
wherein obtaining, from the timestamp counter, the plurality of count values includes:
acquiring, as a count value, an initial timestamp from the timestamp circuit while the producing process produces the log entry;
wherein determining the plurality of time instants includes:
calculating a time instant based on the initial timestamp; and
wherein correcting the target rough time instant includes:
providing a corrected timestamp in response to application of a correction factor to the target rough time instant calculated based on the initial timestamp.

10. The method of claim 9, further comprising:
performing a log recovery operation to recover data using the corrected timestamp.

11. An electronic device for correcting rough logging times of log entries in a log of the electronic device, the electronic device comprising:
a processor; and
a memory having computer program instructions stored thereon, the processor executing the compute program instructions in the memory to control the electronic device to perform acts including:
recording respective log entries in the log, the log entries including associated rough logging times and log information obtained during the running of a program or process of the storage system;
obtaining, from a timestamp counter, a plurality of count values associated with the respective log entries, the count values representing respective timestamps;
determining, using a kernel of an operating system running on the storage system, a plurality of time instants representing the rough logging times of the respective log entries, the plurality of time instants including a target rough time instant to be corrected;
generating respective estimates of a previously existing processor frequency of a processor in the electronic device from count values and time instants of each of multiple pairs of log entries;
generating a corrected processor frequency of the processor based on the estimates, the corrected processor frequency being more accurate than a frequency of the processor obtained from the kernel; and
correcting the target rough time instant based at least in part on the corrected processor frequency, to determine a corrected time when a corresponding log entry in the log was created.

12. The electronic device of claim 11, wherein generating the respective estimates includes:
determining, for each pair in the multiple pairs of log entries, a time difference between the time instants of the respective pair; and
determining, for each pair in the multiple pairs of log entries, a count value difference between the count values of the respective pair,
wherein generating the estimates is based on the time difference and count value difference of each pair in the multiple pairs of log entries.

13. The electronic device of claim 12, wherein generating the corrected processor frequency includes:
averaging the estimates.

14. The electronic device of claim 13, wherein averaging the estimates includes:
averaging estimates with values within a predetermined range.

15. The electronic device of claim 13, wherein generating the respective estimates includes:
in response to an estimate being greater than a first predetermined threshold, using the first predetermined threshold as the estimate;
in response to an estimate being smaller than a second predetermined threshold, using the second predetermined threshold as the estimate, the second predetermined threshold being smaller than the first predetermined threshold.

16. The electronic device of claim 11, wherein correcting the target rough time instant includes
determining, based on the plurality of count values and the corrected processor frequency, a set of corrected time instants;
determining, based on the set of corrected time instants, a set of correction increments;
determining a correction factor based on the set of correction increments; and
correcting the target rough time instant by applying the correction factor to the target rough time instant.

17. The electronic device of claim 16, wherein determining a correction factor comprises:
determining the correction factor by averaging at least a part of the set of correction increments.

18. The electronic device of claim 17, wherein determining the correction factor by averaging at least a part of the set of correction increments comprises:
determining the correction factor by averaging correction increments of the set of correction increments within a predetermined range.

19. A computer program product having a non transitory computer readable medium which stores a set of instructions to manage correcting rough logging times of log entries in a log of a storage system; the set of instructions, when carried out by computerized circuitry, causing the computerized circuitry to perform a method of:
recording respective log entries in the log, the log entries including associated rough logging times and log information obtained during the running of a program or process of the storage system;

obtaining, from a timestamp counter, a plurality of count values associated with the respective log entries, the count values representing respective timestamps;

determining, using a kernel of an operating system running on the storage system, a plurality of time instants representing the rough logging times of the respective log entries in the storage system, the plurality of time instants including a target rough time instant to be corrected;

generating respective estimates of a previously existing processor frequency of a processor in the storage system from count values and time instants of each of multiple pairs of log entries;

generating a corrected processor frequency of the processor based on the estimates, the corrected processor frequency being more accurate than a frequency of the processor obtained from the kernel; and correcting the target rough time instant based at least in part on the corrected processor frequency, to determine a corrected time when a corresponding log entry in the log was created.

* * * * *